United States Patent Office 3,266,717
Patented August 16, 1966

3,266,717
ADDITION PRODUCTS FROM HALOGENOSUL-
FONYL - ISOCYANATES AND OLEFINS AND
PROCESS FOR PREPARING THEM
Dieter Günther and Fritz Soldan, Kelkheim, Taunus,
Germany, assignors to Farbwerke Hoechst Aktiengesell-
schaft vormals Meister Lucius & Brüning, Frankfurt
am Main, Germany, a corporation of Germany
No Drawing. Filed Mar. 2, 1965, Ser. No. 436,655
Claims priority, application Germany, Mar. 6, 1964,
F 42,218
11 Claims. (Cl. 260—301)

The present invention relates to new addition products from halogenosulfonyl-isocyanates and olefins and to a process for preparing them. More particularly, the invention relates to compounds of the general Formula 1 or 2

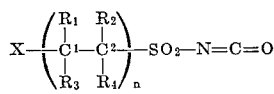   (1)

or

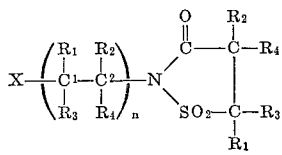   (2)

wherein X represents a chlorine or a bromine atom, $R_1$, $R_2$, $R_3$ and $R_4$ represent hydrogen atoms or alkyl, alkenyl, cycloalkyl, cycloalkenyl or aryl groups which may be substituted by halogen atoms or lower alkyl or alkoxy groups, and $R_1$ and $R_2$ or $R_3$ and $R_4$ represent together with the carbon atoms $C^1$ and $C^2$ the radical of a saturated isocyclic ring, and $n$ stands for an integer from 1 to 5.

We have found that new compounds of the general Formula 1 or 2 given above can be prepared in a smooth reaction and in good to very good yields by reacting halogenosulfonyl-isocyanates of the formula $$O=C=N-SO_2X \quad (3)$$

wherein X has the meaning given above, in the presence of radical-forming agents with an excess of a hydrocarbon containing at least one olefinic double linkage in the molecule.

Among the hydrocarbons which contain at least one olefinic double linkage there may be used preferably those which are not branched at the double linkage. According to the process of the invention there may be used, for example, ethylene, propylene, butylene-1, the α-olefins which are liquid under normal conditions, such as, for example, hexene-1, octene-1, 4-methylpentene-1, dodecene-1, octadecene-1, olefins with an internal double linkage, such as butene-2, pentene-2, hexene-3, octene-2, octene-3, octene-4 or dodecene-6.

Cyclic or bicyclic alkenes, such as cyclohexene, cyclooctene, bicycloheptene-(2,1,2), may also be used for the reaction. Moreover, there may also be reacted hydrocarbons containing more than one double linkage, such, for example, as butadiene, hexadiene-1,5, dicyclopentadiene, bicycloheptadiene-(2,1,2), cyclooctadiene-1,5 or cyclododecatriene-1,5,9.

In the presence of radical-forming starting substances the reaction of the halogensulfonyl-isocyanates with the olefins used according to the process of the invention takes place surprisingly rapidly and takes a course which could not be foreseen. Thus, it is now possible to react ethylene, which the state of the art did not permit hitherto. The reaction with the use of ethylene takes place according to the following scheme:

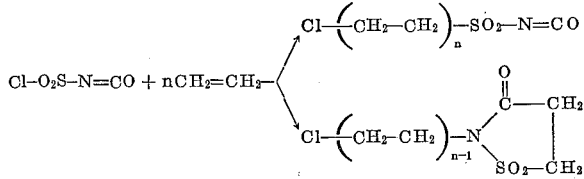

The reaction takes place in analogous manner when using one of the olefins mentioned above instead of ethylene.

As radical-forming starting substances (catalysts) there may be used all the compounds which are capable of yielding radicals under the reaction conditions, such, for example, as peroxides or azo compounds. Some compounds of this kind are, for example, azo-bis-isobutyronitrile, diisopropyl-peroxy-dicarbonate, di-tert.butyl-peroxide, and benzoylperoxide. The catalyst is generally used in a quantity of 0.01–20% by weight, preferably of 0.1–5% by weight referred to the amount of halogenosulfonyl-isocyanate used. Moreover, the radicals required to provoke the reaction can be obtained by exposing the reaction mixture to appropriate radiation, e.g. to ultra-violet or gamma radiation.

The process of the present invention can be carried out without the aid of solvents. In many cases, however, it is advisable to work in the presence of solvents and diluents sufficiently inert toward the halogenosulfonyl-isocyanate used, such, for example, as ether, benzene, methylene chloride, cyclohexane, isooctane, trichloroethylene or carbon tetrachloride. It is also possible to use an excess of the olefinic reaction component, for example of hexene-1, octene-1 or cyclohexene.

The reaction temperature may vary within wide limits. Thus, the process of the present invention may be carried out at temperatures within the range from about −20° to about +200° C., preferably from about 20° to 150° C. The optimal temperature to be applied in each individual case depends in the first place on the radical-forming starting substances used and on the stability of the products formed. When using, for example, azo or peroxide compounds as catalysts their decomposition temperature should be taken into account. When using radiation, as for example ultraviolet or gamma rays, and taking into account the stability of the products to be formed, any temperature within the range given may be applied.

The reaction of the halogenosulfonyl-isocyanates with gaseous olefins, such as ethylene, is advantageously carried out under pressure. The pressure applied may be within the range from 1 to 1000 atmospheres gauge pressure, preferably from 5 to 200 atmospheres gauge pressure.

The products obtained according to the process of the present invention are new compounds which, due to their high reactivity, may be used for a large number of reactions. They constitute valuable intermediate products for the preparation of pesticides, textile auxiliary agents or sulfonyl-ureas (antidiabetics for oral administration).

The following examples serve to illustrate the invention but they are not intended to limit it thereto.

*Example 1*

141 grams of chlorosulfonyl-isocyanate are dissolved in 1200 ml. of methylene chloride in an autoclave of 2 liters capacity which is equipped with a stirrer. The mixture is heated to the reaction temperature of 100° C., and ethylene is introduced until the pressure amounts to 30 atmospheres gauge pressure. Subsequently, a solution of 2.8 grams of azo-bis-isobutyronitrile in 100 ml. of methylene chloride is introduced into the autoclave slowly and in portions within one hour. When the addition is terminated the whole is allowed to react for another two hours at the same temperature. The methylene chloride and the unreacted chlorosulfonyl-isocyanate are then separated from the reaction mixture by distillation. 183 grams of a liquid crude product are obtained, which can be split up by fractional distillation into the following products:

20 grams of 2-chloroethylsulfonyl-isocyanate, boiling at 63–68° C. under a pressure of 0.3 mm. Hg,
95 grams of 4-chlorobutylsulfonyl-isocyanate, boiling at 100–102° C. under a pressure of 0.3 mm. Hg,
37 grams of a high-boiling fraction consisting essentially of N-2-chloroethyl-sulfopropionimide, boiling at 150–153° C. under a pressure of 0.5 mm. Hg and melting at 59–61° C.

Analysis.—4-chlorobutylsulfonyl-isocyanate ($C_5H_8O_3NSCl$)

calculated: C, 30.4; H, 4.0; N, 7.1; S, 16.2; Cl, 18.0%.
Found: C, 30.3; H, 4.1; N, 6.9; S, 16.7; Cl, 18.5%.
N-2-chloroethyl-sulfopropionimide ($C_5H_8O_3NSCl$) calculated: C, 30.4; H, 4.0; N, 7.1; S, 16.2; Cl, 18.0%.
Found: C, 30.7; H, 4.1; N, 7.3; S, 15.7; Cl, 17.5%.

Example 2

Chlorosulfonyl-isocyanate is reacted with ethylene at 60° C. in the manner described in Example 1, but in the presence of 2.8 grams of diisopropyl-peroxydicarbonate instead of azo-bis-isobutyronitrile. 219 grams of a liquid crude product are obtained which can be split up by fractional distillation into the following products:

30 grams of 2-chloroethylsulfonyl-isocyanate,
120 grams of 4-chlorobutylsulfonyl-isocyanate, and
47 grams of N-(2-chloroethyl)-sulfopropionimide.

Example 3

A solution of 141 grams of chlorosulfonyl-isocyanate in 1200 ml. of methylene chloride is refluxed (at 40° C.) until weakly boiling, while introducing ethylene. During the operation the reaction mixture is exposed to ultra-violet rays by means of an immersion lamp. The reaction is interrupted after 4 hours and the reaction mixture is worked up by distillation. There are obtained 20 grams of 2-chloroethylsulfonyl-isocyanate which, after reaction with n-propanol, yields N-(2-chloroethylsulfonyl)-carbamic acid n-propylester melting at 44° C.

Example 4

141 grams of chlorosulfonyl-isocyanate and 80 ml. of benzene are introduced into an autoclave and the whole is heated to a reaction temperature of 100° C. Ethylene is then introduced until the pressure amounts to 60 atmospheres gauge pressure. Subsequently, 5.6 grams of azo-bis-isobutyronitrile dissolved in 100 ml. of benzene are added in portions within 2 hours. After distillation of the solvent and of the unreacted chlorosulfonyl-isocyanate, 72 grams of a liquid crude product remain which may be split up by fractional distillation into the following products:

7 grams of 2-chloroethylsulfochloride, boiling at 37–38° C. at a pressure of 0.3 mm. Hg,
8 grams of 2-chloroethylsulfonyl-isocyanate, boiling at 54–58° C. at a pressure of 0.2 mm. Hg,
4 grams of benzenesulfochloride, boiling at 75–76° C. at a pressure of 0.5 mm. Hg,
8 grams of 4-chlorobutylsulfonyl-isocyanate, boiling at 102–104° C. at a pressure of 0.2 mm. Hg, and
21 grams of a residue which is not distillable.

Example 5

1.5 grams of diisopropyl-peroxydicarbonate dissolved in 50 grams of hexene-1 are dropped within 2 hours at 60° C., while stirring, into a reaction mixture of 71 grams of chlorosulfonyl-isocyanate and 100 grams of hexene-1. Stirring is continued for 2 hours and the unreacted starting substances are then distilled off. 117 grams of a liquid reaction product are obtained which are purified by thin-layer distillation. 50 grams of 2-chlorohexylsulfonyl-isocyanate are isolated boiling at 92–95° C. at a pressure of 0.3 mm. Hg. By reaction with methanol N-(2-chlorohexylsulfonyl)-carbamic acid methylester is obtained having a melting point of 87–88° C.

Analysis. — N-(2-chlorohexylsulfonyl)-carbamic acid methylester ($C_8H_{16}O_4NSCl$) (molecular weight 258) calculated: C, 37.2; H, 6.2; N, 5.4; S, 12.4; Cl, 13.8. Found: C, 37.4; H, 6.3; N, 6.0; S, 12.5; Cl, 14.1.

Example 6

1.5 grams of diisopropyl-peroxydicarbonate dissolved in 50 grams of octene-1 are dropwise added within 4 hours, at 60° C., to a solution of 71 grams of chlorosulfonyl-isocyanate in 100 grams of octene-1. Subsequently, the excessive octene-1 and the unreacted chlorosulfonyl-isocyanate are distilled off. There remain 120 grams of a liquid product which is purified by thin-layer distillation. 40 grams of 2-chlorooctylsulfonyl-isocyanate are obtained boiling at 100–105° C. at a pressure of 0.3 mm. Hg. By reaction with methanol N-(2-chlorooctylsulfonyl)-carbamic acid methylester is obtained melting at 53–55° C.

Analysis. — N-(2-chlorooctylsulfonyl)-carbamic acid methylester ($C_{10}H_{20}O_4NSCl$) calculated: C, 42.0; H, 7.0; N, 4.9; S, 11.2; Cl, 12.6. Found: C, 42.2; H, 7.0; N, 5.2; S, 11.4; Cl, 12.9.

Example 7

A solution of 70 grams of chlorosulfonyl-isocyanate in 100 grams of cyclohexene is heated to 60° C. 1.6 grams of diisopropyl-peroxydicarbonate dissolved in 50 ml. of cyclohexene are slowly dropped into the solution while stirring. The reaction time amounts to 3 hours. The reaction mixture is cooled to 5° C. and 68 grams of N-2-chlorocyclohexyl-sulfocyclohexane carboxylic acid imide separate while cooling. After recrystallization from acetone two isomers of the compound mentioned above can be obtained melting at 182–184° C. and 146–148° C. respectively.

Analysis.—$C_{13}H_{20}ClNO_3S$ (molecular weight 306) calculated: C, 51.0; H, 6.5; Cl, 11.8; N, 4.6; S, 10.9. Found: C, 51.1; H, 7.0; Cl, 11.8; N, 4.6; S, 10.7.

Example 8

141 grams of chlorosulfonyl-isocyanate, 1200 ml. of methylene chloride and 100 grams of propylene are introduced into an autoclave of 2 liters capacity and heated to 100° C. 2.8 grams of azo-bis-isobutyronitrile dissolved in 100 ml. of methylene chloride are then added slowly and in portions. After a reaction period of 4 hours the batch is removed from the autoclave and the solvent as well as unreacted chlorosulfonyl - isocyanate are distilled off. There remain 129 grams of a liquid product which is worked up by distillation and yields.

34 grams of chloropropylsulfonyl-isocyanate boiling at 52–54° C. at a pressure of 0.2 mm. Hg,
18 grams of chlorohexylsulfonyl-isocyanate boiling at 85–92° C. at a pressure of 0.4 mm. Hg, and
77 grams of a compound boiling at 132–137° C. at a pressure of 0.2 mm. Hg, which is an isomer of chlorohexylsulfonyl-isocyanate and probably constitutes a sulfopropionic acid imide derivative.

Example 9

Into a 2 l.-autoclave made of VA-steel, which is equipped with a stirrer and heated to 70° C., ethylene is introduced until a pressure of 40 atmospheres gauge pressure is obtained. Within 2½ hours, 7 grams of diisopropyl-peroxydicarbonate dissolved in 705 grams of chlorosulfonyl-isocyanate are introduced in portions into an autoclave by means of a liquid pump to such an extent that the reaction temperature does not exceed 70° C. After another short time of reaction the contents of the autoclave are removed and worked up by distillation in vacuo. Apart from a certain amount of unreacted starting substance there are obtained:

50 grams of 2-chloroethylsulfonyl-isocyanate,
180 grams of 4-chlorobutylsulfonylisocyanate, and
20 grams of N-(2-chloroethyl)-sulfopropionimide.

*Example 10*

A solution of 282 grams of chlorosulfonyl-isocyanate in 1000 ml. of i-octane is introduced into an autoclave of 2 liters capacity which is equipped with a stirrer. The whole is heated to 70° C., ethylene is introduced, until the pressure amounts to 50 atmospheres gauge pressure, and then a solution of 5.6 grams of diisopropyl-peroxydicarbonate dissolved in 200 ml. of i-octane is pumped into the autoclave to such an extent that the reaction temperature does not exceed 70° C. The reaction pressure is maintained at 40–50 atmospheres gauge pressure by pressing in ethylene. If after addition of the catalyst the pressure remains stable the contents of the autoclave which form two layers are removed. The upper layer consists of isooctane, which contains unreacted chlorosulfonyl-isocyanate, and may be used further without purification. The lower consists essentially of the reaction products which are obtained in pure state by distillation in vacuo. There are obtained:

30 grams of 2-chloroethylsulfonyl-isocyanate,
230 grams of 4-chlorobutylsulfonyl-isocyanate, and
40 grams of a liquid, high-boiling residue containing the high-molecular $\omega$-chloroalkylsulfonyl-isocyanates formed during the reaction.

*Example 11*

A solution of 839 grams of chlorosulfonyl-isocyanate in 2.5 liters of methylene chloride is exposed to ultraviolet rays, at 20° C., while passing through ethylene. After 14 days the solvent and unreacted chlorosulfonyl-isocyanate are removed in vacuo, 141 grams of chlorosulfonyl-isocyanate being recovered. Thus, 83% of the substance were reacted. The residue crystallizes and is purified by washing with ether. 685 grams of N-2-chloroethyl-sulfopropionimide melting at 58–60° C. are obtained, corresponding to 70% of the theoretical yield (referred to the amount of chlorosulfonyl-isocyanate used). The ethereal stock solution is worked up by distillation and yields 100 grams of 2-chloroethylsulfonyl-isocyanate boiling at 54° C. at a pressure of $10^{-2}$ mm. Hg.

*Example 12*

1500 ml. of carbon tetrachloride are introduced into a flask provided with a stirrer and heated to 60° C. Ethylene is passed through in a rapid flow and, simultaneously, 2 kg. of chlorosulfonyl-isocyanate and 40 grams of diisopropyl-peroxydicarbonate dissolved in 200 ml. of carbon tetrachloride are dropped in. The reaction is terminated after 5 minutes. The solvent and unreacted chlorosulfonyl-isocyanate are distilled off, 1.5 kg. of chlorosulfonyl-isocyanate being recovered. The conversion amounts to 25% referred to the amount of chlorosulfonyl-isocyanate used. After working up by distillation, there are obtained 370 grams of 2-chloroethyl-sulfonyl-isocyanate boiling at 54° C. at a pressure of $10^{-2}$ mm. Hg and corresponding to 60% of the theoretical yield.

*Analysis.*—$C_3H_4ClNO_3S$ (molecular weight 169.5) calculated: C, 21.2; H, 2.4; Cl, 21.0; N, 8.3; S, 18.8. Found: C, 21.7; H, 2.8; Cl, 20.5; N, 8.3; S, 18.4.

*Example 13*

1.5 liters of carbon tetrachloride are heated to 60° C. in a flask of 4 liters capacity which is provided with a stirrer, and propylene is then passed through in a rapid flow. Simultaneously, 2 kg. of chlorosulfonyl-isocyanate and 40 grams of diisopropyl-peroxydicarbonate dissolved in 200 ml. of carbon tetrachloride are dropped in. The reaction is terminated after 5 hours. The solvent and unreacted chlorosulfonyl-isocyanate are distilled off in vacuo, 197 grams of chlorosulfonyl-isocyanate being recovered. Thus, the conversion amounts to 90% referred to the amount of chlorosulfonyl-isocyanate used.

Working up by distillation yields 1880 grams of 2-chloropropylsulfonyl-isocyanate boiling at 65° C. at a pressure of $10^{-2}$ mm. Hg and corresponding to 76% of the theoretical yield.

*Analysis.*—$C_4H_6ClNO_3S$ (molecular weight 183.5) calculated: C, 26.1; H, 3.3; Cl, 19.3; N, 7.6; S, 17.4. Found: C, 25.6; H, 3.4; Cl, 19.4; N, 8.3; S, 17.1.

When reacting, for example, 2-chloropropylsulfonyl-isocyanate with dimethylamine and perchloromethylmercaptan a pesticide having a systemic action is obtained which corresponds to the following formula

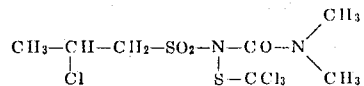

The product boils at 63–64° C.

*Example 14*

3 liters of i-octane are exposed to ultraviolet rays in a corresponding apparatus. 5 mols of chlorosulfonyl-isocyanate are added and butene-2 is passed through the reaction mixture at 20° C. In the same proportion as the reaction product formed (lower layer) is continuously removed, fresh chlorosulfonyl-isocyanate is added. Thus, 20.6 mols of chlorosulfonyl-isocyanate are added within 6 days. 8.0 mols of chlorosulfonyl-isocyanate are recovered by distillation, corresponding to a conversion of 63% referred to the amount of chlorosulfonyl-isocyanate used. Further working up yields:

(A) 964 grams (4.88 mols) of 1-methyl-2-chloropropylsulfonyl-isocyanate (conversion: 39% of the theory); boiling point: 68° C. at a pressure of $5 \cdot 10^{-3}$ mm. Hg;

(B) 1894 grams (7.48 mols) of 3,4-dimethyl-N-(1-methyl-2-chloropropyl)-sulfopropionimide (conversion: 59% of the theory); boiling point: 110° C. at a pressure of $5 \cdot 10^{-3}$ mm. Hg.

Analyses:

(A) $C_5H_8ClNO_3S$ (molecular weight 197.5) calculated: C, 30.4; H, 4.0; Cl, 18.0; N, 7.1; S, 16.2. Found: C, 30.4; H, 4.4; Cl, 17.9; N, 7.2; S, 16.4.

(B) $C_9H_{17}ClNO_3S$ (molecular weight 253.5) calculated: C, 42.6; H, 6.3; Cl, 13.9; N, 5.5; S, 12.6. Found: C, 42.2; H, 6.7; Cl, 13.7; N, 5.7; S, 12.7.

We claim:

1. A compound of a formula selected from the group consisting of

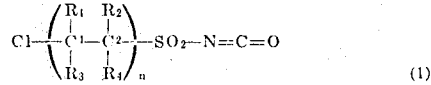

and

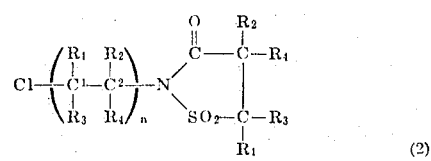

in which $R_1$, $R_2$, $R_3$ and $R_4$ represent members selected from the group consisting of hydrogen and lower alkyl and together with carbon atoms $C^1$ and $C^2$ cyclohexylene and $n$ represents an integer from 1 to 3.

2. The compound of the formula

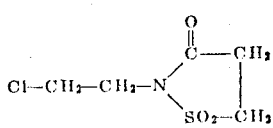

3. The compound of the formula $$Cl-CH_2-CH_2-SO_2-N=C=O$$

4. The compound of the formula

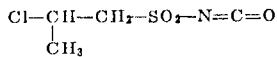

5. The compound of the formula

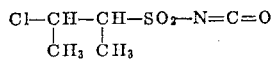

6. The compound of the formula

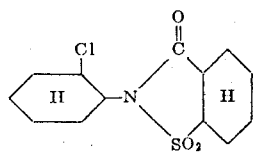

7. A process for the manufacture of compounds of a formula selected from the group consisting of

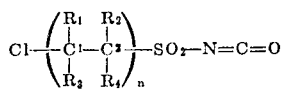

and

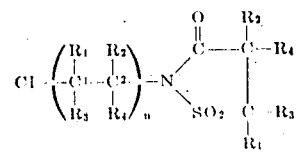

in which $R_1$, $R_2$, $R_3$ and $R_4$ represent members selected from the group consisting of hydrogen and lower alkyl and together with carbon atoms $C^1$ and $C^2$ cyclohexylene and $n$ represents an integer from 1 to 3, which comprises reacting 1 mol of chlorosulfonylisocyanate with 1 to 3 mols of a compound selected from the group consisting of alkene having from 2 to 12 carbon atoms and cyclohexene at a temperature between about $-20°$ and $+200°$ C. in the presence of a radical-forming agent.

8. The process as claimed in claim 7, wherein as a radical-forming agent there is employed a compound selected from the group consisting of azo-bis-isobutyronitrile, diisopropyl-peroxydicarbonate, benzoylperoxide and di-tert, butylperoxide.

9. The process as claimed in claim 7, wherein the reaction is carried out under irradiation of the reaction mixture with ultraviolet rays.

10. The process as claimed in claim 7, wherein the reaction is carried out in a diluent which is inert toward the employed chlorosulfonylisocyanate.

11. The process as claimed in claim 7, wherein the radical-forming agent is present in an amount ranging from 0.01 to 20 percent by weight calculated on the employed chlorosulfonylisocyanate.

No references cited.

HENRY R. JILES, *Acting Primary Examiner.*
ALTON D. ROLLINS, *Assistant Examiner.*